United States Patent
Ueo et al.

(10) Patent No.: US 12,126,198 B2
(45) Date of Patent: Oct. 22, 2024

(54) POWER SUPPLY DEVICE AND CONTROL METHOD FOR POWER SUPPLY DEVICE

(71) Applicant: TOYOTA JIDOSHA KABUSHIKI KAISHA, Toyota (JP)

(72) Inventors: Daisuke Ueo, Toyota (JP); Ryota Tanabe, Kariya (JP); Yohei Imai, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 18/211,629

(22) Filed: Jun. 20, 2023

(65) Prior Publication Data

US 2024/0047981 A1    Feb. 8, 2024

(30) Foreign Application Priority Data

Aug. 5, 2022  (JP) ................. 2022-125543

(51) Int. Cl.
*H02J 7/00* (2006.01)
*H02M 3/155* (2006.01)

(52) U.S. Cl.
CPC ........ *H02J 7/00308* (2020.01); *H02J 7/0068* (2013.01); *H02M 3/155* (2013.01)

(58) Field of Classification Search
CPC .... H02J 7/00308; H02J 7/0068; H02M 3/155; B60L 53/00; B60L 53/20; B60L 55/00
See application file for complete search history.

(56) References Cited

U.S. PATENT DOCUMENTS

| | | | |
|---|---|---|---|
| 10,471,837 B2 | 11/2019 | Herke et al. | |
| 2012/0146610 A1 | 6/2012 | Yamashita et al. | |
| 2020/0161859 A1* | 5/2020 | Bell ........................ | H02J 3/14 |
| 2021/0091573 A1 | 3/2021 | Takamatsu et al. | |

FOREIGN PATENT DOCUMENTS

| | | |
|---|---|---|
| JP | 2011-010406 A | 1/2011 |
| JP | 2020-018078 A | 1/2020 |
| JP | 2021-048759 A | 3/2021 |

* cited by examiner

*Primary Examiner* — Carlos Amaya
(74) *Attorney, Agent, or Firm* — Dinsmore & Shohl LLP (57) ABSTRACT

Disclosed herein is a power supply device and a control method for the power supply device. The power supply device includes: a battery; an external interface electrically connected to the battery and electrically attachable to or detachable from an external device; a voltage converter provided between the battery and the external interface; a low-voltage circuit that branches from an interface connection circuit connecting the external interface and the voltage converter and is connected to a low-voltage load having a rated voltage lower than a voltage of the battery; an interrupt circuit provided in the low-voltage circuit and configured to electrically interrupt the low-voltage circuit and the interface connection circuit; and an electronic control unit configured to control operations of the voltage converter and the interrupt circuit. The electronic control unit operates the interrupt circuit when a voltage of the interface connection circuit exceeds the rated voltage of the low-voltage load.

14 Claims, 10 Drawing Sheets

POWER SUPPLY DEVICE AND CONTROL METHOD FOR POWER SUPPLY DEVICE

CROSS-REFERENCE TO RELATED APPLICATION

This application claims priority to Japanese Patent Application No. 2022-125543 filed on Aug. 5, 2022, incorporated herein by reference in its entirety.

BACKGROUND

1. Technical Field

The technology disclosed herein relates to a power supply device and a control method for the power supply device.

2. Description of Related Art

U.S. Pat. No. 10,471,837 discloses a power supply device including a battery having a rated voltage of 800 V, a booster connected to the battery, a charging socket, and a controller. The booster includes a voltage converter and a bypass circuit that bypasses the voltage converter. When a charging device having a rated voltage of 400 V is electrically connected to the charging socket, the controller causes the voltage converter to step up electric power of the charging device to 800 V. Thus, electric power of 800 V is supplied to the battery. When a charging device having a rated voltage of 800 V is electrically connected to the charging socket, the controller electrically conducts the bypass circuit of the booster. Thus, electric power of 800 V of the charging device is supplied to the battery by bypassing the voltage converter.

SUMMARY

The power supply device may include a low-voltage circuit that branches from a circuit connecting the charging socket and the voltage converter and is connected to a low-voltage load having a rated voltage lower than that of the battery. According to such a configuration, for example, the discharged power of the battery is supplied to the low-voltage load after being stepped down by the voltage converter. If the discharged power of the battery is supplied to the low-voltage load without being stepped down, however, the low-voltage load may be damaged. The present specification provides a power supply device capable of suppressing damage to the low-voltage load and a control method for the power supply device.

The technology disclosed herein relates to a power supply device and a control method for the power supply device. A first aspect relates to a power supply device including a battery, an external interface, a voltage converter, a low-voltage circuit, an interrupt circuit, and an electronic control unit. The external interface is electrically connected to the battery and electrically attachable to or detachable from an external device. The voltage converter is provided between the battery and the external interface. The low-voltage circuit branches from an interface connection circuit connecting the external interface and the voltage converter and is connected to a low-voltage load having a rated voltage lower than a voltage of the battery. The interrupt circuit is provided in the low-voltage circuit and configured to electrically interrupt the low-voltage circuit and the interface connection circuit. The electronic control unit is configured to control operations of the voltage converter and the interrupt circuit. The electronic control unit is configured to operate the interrupt circuit when a voltage of the interface connection circuit exceeds the rated voltage of the low-voltage load.

According to the power supply device of the first aspect described above, the low-voltage circuit that branches from the interface connection circuit includes the interrupt circuit that electrically interrupts the low-voltage circuit and the interface connection circuit. The electronic control unit operates the interrupt circuit when the voltage of the interface connection circuit exceeds the rated voltage of the low-voltage load. Therefore, the low-voltage circuit and the interface connection circuit are electrically interrupted. Thus, an overvoltage exceeding the rated voltage of the low-voltage load is not supplied to the low-voltage circuit. Accordingly, the power supply device can suppress damage to the low-voltage load.

In the power supply device of the first aspect, the interrupt circuit may include a first switching element. The electronic control unit may be configured to cause the first switching element to electrically interrupt the low-voltage circuit when the voltage of the interface connection circuit exceeds the rated voltage of the low-voltage load. According to the power supply device configured as described above, damage to the low-voltage load can be suppressed with a relatively simple circuit configuration.

In the power supply device configured as described above, the electronic control unit may be configured to cause the voltage converter to step down the voltage output from the battery to the interface connection circuit. The electronic control unit may be configured to cause the first switching element to electrically conduct the low-voltage circuit when the voltage of the interface connection circuit is lower than the rated voltage of the low-voltage load. According to the power supply device configured as described above, the output of the voltage converter can be supplied to the low-voltage load without damaging the low-voltage load.

In the power supply device having any one of the above configurations, the electronic control unit may be configured to cause the first switching element to electrically conduct the low-voltage circuit when a rated voltage of the external device is equal to or lower than the rated voltage of the low-voltage load. According to the power supply device configured as described above, damage to the low-voltage load can be suppressed with a relatively simple control configuration.

In the power supply device having any one of the configurations, the voltage converter may include an upper switching element connected to a cathode of the battery, a lower switching element connected in series to the upper switching element and connected to an anode of the battery and a negative terminal of the external interface, and a reactor provided between a midpoint of the upper switching element and the lower switching element and a positive terminal of the external interface. The electronic control unit may be configured to execute a first mode in which the upper switching element of the voltage converter is kept ON when a rated voltage of the external device is equal to or higher than the voltage of the battery, and a second mode in which the upper switching element and the lower switching element of the voltage converter are intermittently turned ON and OFF when the voltage of the interface connection circuit is lower than the voltage of the battery. According to the power supply device configured as described above, the interface connection circuit and the battery can be connected via the voltage converter regardless of the rated voltage of the external device. Therefore, it is not necessary to provide a bypass circuit for bypassing the voltage converter as in the related art. Thus, the structure of the power supply device can be simplified.

The power supply device configured as described above may further include a second switching element provided in the interface connection circuit and configured to electrically conduct or interrupt the interface connection circuit. The electronic control unit may be configured to cause the second switching element to electrically interrupt the interface connection circuit when a short circuit failure occurs in the upper switching element of the voltage converter. According to the power supply device configured as described above, it is possible to prevent the voltage of the battery from being supplied to the external device via the external interface without being stepped down when the short circuit failure occurs in the upper switching element.

In the power supply device configured as described above, both the first switching element and the second switching element may be provided in a single first semiconductor package. According to the power supply device configured as described above, both the first switching element and the second switching element can be disposed with good spatial efficiency. Thus, the size of the power supply device can be reduced.

In the power supply device configured as described above, both the upper switching element and the lower switching element may be provided in a single second semiconductor package. The first semiconductor package and the second semiconductor package may have the same structure. According to the power supply device configured as described above, the pair of the first switching element and the second switching element and the pair of the upper switching element and the lower switching element can be structured in the same semiconductor packages. Thus, the manufacturing efficiency of the power supply device can be improved.

In the power supply device having any one of the above configurations, the electronic control unit may be configured to cause the first switching element to electrically interrupt the low-voltage circuit when an abnormality occurs in the low-voltage load connected to the low-voltage circuit regardless of the voltage of the interface connection circuit. According to the power supply device configured as described above, it is possible to prevent damage to the battery or the like due to the abnormality occurring in the low-voltage load.

In the power supply device of the first aspect, the voltage of the battery may be a rated voltage of the battery. In another embodiment, the voltage of the battery may be a measured actual voltage of the battery.

In the power supply device having any one of the configurations of the above aspect, the external interface may be configured such that a charging device configured to supply charging power for the battery to the external interface is electrically attachable or detachable as the external device. According to the power supply device configured as described above, the battery can be charged by the external device.

In the power supply device having any one of the configurations of the above aspect, the external interface may be configured such that an external load configured to receive discharged power of the battery from the external interface is electrically attachable or detachable as the external device. According to the power supply device configured as described above, the discharged power of the battery can be supplied to the external device.

A second aspect of the present disclosure relates to a control method for a power supply device including a battery, an external interface, a voltage converter, a low-voltage circuit, and an interrupt circuit. The external interface is electrically connected to the battery and electrically attachable to or detachable from an external device. The voltage converter is provided between the battery and the external interface. The low-voltage circuit branches from an interface connection circuit connecting the external interface and the voltage converter and is connected to a low-voltage load having a rated voltage lower than a voltage of the battery. The interrupt circuit is provided in the low-voltage circuit and configured to electrically interrupt the low-voltage circuit and the interface connection circuit. The control method includes (i) controlling operations of the voltage converter and the interrupt circuit, and (ii) operating the interrupt circuit when a voltage of the interface connection circuit exceeds the rated voltage of the low-voltage load.

According to the control method for the power supply device of the second aspect described above, the low-voltage circuit that branches from the interface connection circuit includes the interrupt circuit that electrically interrupts the low-voltage circuit and the interface connection circuit. The interrupt circuit is operated when the voltage of the interface connection circuit exceeds the rated voltage of the low-voltage load. Therefore, the low-voltage circuit and the interface connection circuit are electrically interrupted. Thus, an overvoltage exceeding the rated voltage of the low-voltage load is not supplied to the low-voltage circuit. Accordingly, the power supply device can suppress damage to the low-voltage load.

A third aspect of the present disclosure relates to a power supply device including a battery, an external interface, a voltage converter, a low-voltage circuit, a step-down converter, and an electronic control unit. The external interface is electrically connected to the battery and electrically attachable to or detachable from an external device. The voltage converter is provided between the battery and the external interface. The low-voltage circuit branches from an interface connection circuit connecting the external interface and the voltage converter and is connected to a low-voltage load having a rated voltage lower than a voltage of the battery. The step-down converter is provided in the low-voltage circuit and configured to step down a supply voltage from the interface connection circuit to the low-voltage circuit. The electronic control unit is configured to control operations of the voltage converter and the step-down converter. The electronic control unit is configured to operate the step-down converter when a voltage of the interface connection circuit exceeds the rated voltage of the low-voltage load.

According to the power supply device of the above aspect, the voltage stepped down by the step-down converter can be supplied to the low-voltage circuit even when the voltage of the interface connection circuit exceeds the voltage of the low-voltage load.

Details and further improvements of the technology disclosed herein will be described in "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
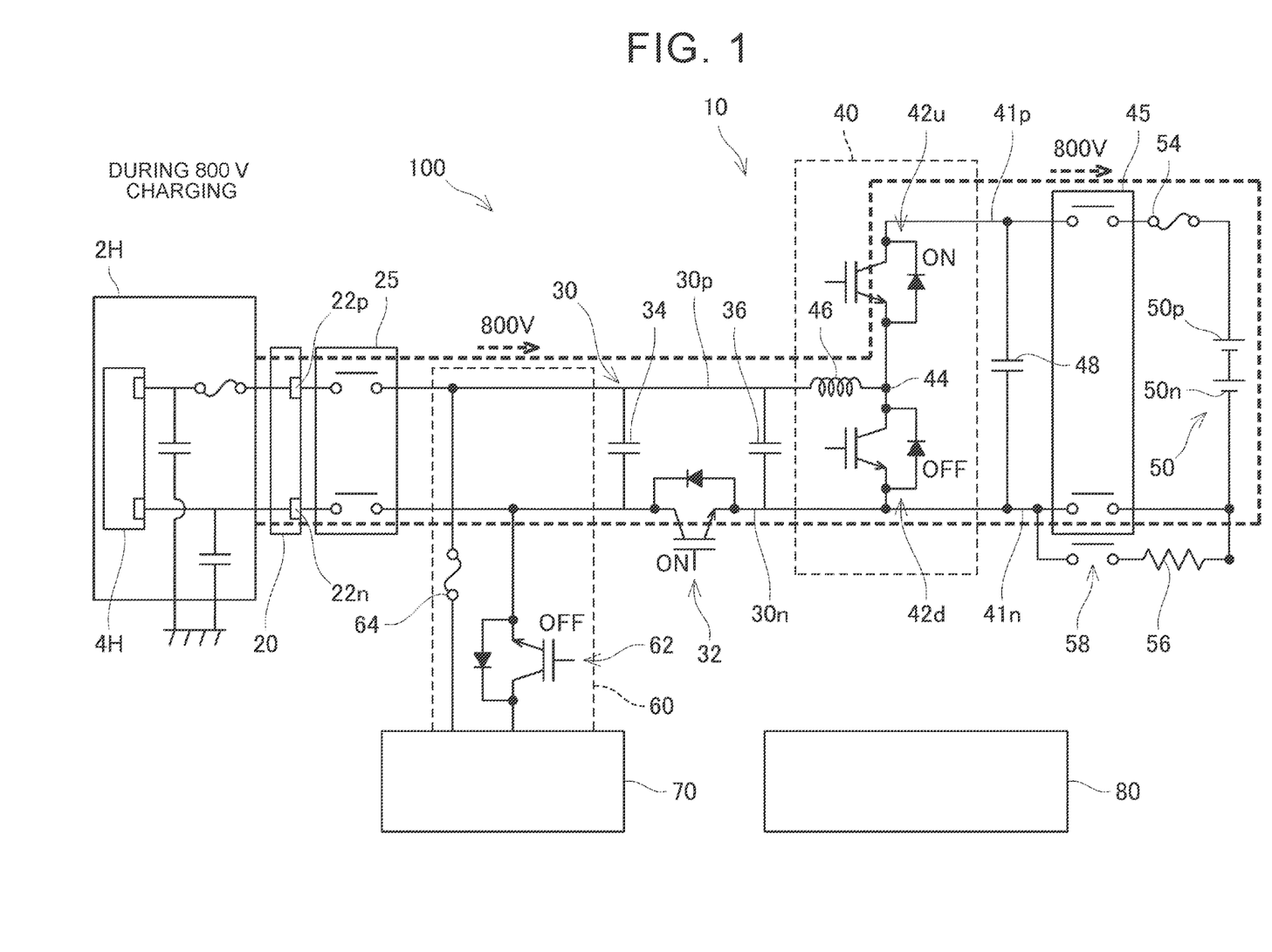
FIG. 1 is a circuit diagram of a power supply device of a first embodiment of the present disclosure during 800 V charging.

A power supply device according to a first embodiment of the present disclosure will be described with reference to the drawings. FIG. 1 is a schematic circuit diagram of a power supply device 10 of the first embodiment that is connected to a high-voltage charging device 4H of a charging station 2H. The power supply device 10 is mounted on an electrified vehicle 100. The power supply device 10 includes an external interface 20, an external relay 25, an interface connection circuit 30, a voltage converter 40, a smoothing capacitor 48, a main relay 45, a battery 50, a low-voltage circuit 60, and an electronic control unit 80. Although illustration is omitted, the power supply device 10 is also electrically connected to a traveling motor of the electrified vehicle 100. The power supply device 10 supplies electric power of the battery 50 to the traveling motor of the electrified vehicle 100 to cause the electrified vehicle 100 to travel. The interface is hereinafter simply referred to as "I/F".

The battery 50 is a rechargeable secondary battery that includes a plurality of secondary battery cells (not shown) such as lithium ion cells and is repeatedly chargeable and dischargeable, as typified by a lithium ion battery. The battery 50 has a rated voltage of 800 V. The battery 50 includes a cathode 50p and an anode 50n.

The external I/F 20 is a port for electrically connecting the power supply device 10 to an external device. The external I/F 20 is provided on the outer surface of the electrified vehicle 100. The external I/F 20 is configured such that a connector (not shown) of a direct-current (DC) external device (for example, the high-voltage charging device 4H) is attachable or detachable. When the connector of the high-voltage charging device 4H is inserted into the external I/F 20, the high-voltage charging device 4H and the power supply device 10 are electrically conducted. When the connector of the high-voltage charging device 4H is detached from the external I/F 20, the high-voltage charging device 4H and the power supply device 10 are electrically interrupted. The external I/F 20 includes a positive terminal 22p and a negative terminal 22n.

In addition to the high-voltage charging device 4H, a connector of a high-voltage power conditioning system (PCS) 7H (see FIG. 3), a low-voltage charging device 4L (see FIG. 4), or a low-voltage PCS 7L (see FIG. 5) is attachable to or detachable from the external I/F 20 as the external device. The high-voltage charging device 4H supplies the external I/F 20 with charging power of 800 V for the battery 50. The high-voltage PCS 7H receives discharged power of 800 V from the battery 50 and distributes it to a supply destination. The low-voltage charging device 4L supplies the external I/F 20 with charging power of 400 V for the battery 50. The low-voltage PCS 7L receives discharged power of 400 V from the battery 50 and distributes it to a supply destination.

The voltage converter 40 is a so-called bidirectional DC-DC converter. As shown in FIG. 1, the voltage converter 40 is provided between the battery 50 and the external I/F 20. The voltage converter 40 includes an upper switching element 42u, a lower switching element 42d, and a reactor 46. The upper switching element 42u is connected to the cathode of the battery 50 via a high-voltage wire 41p. The lower switching element 42d is connected in series to the upper switching element 42u, and is connected to the anode 50n of the battery 50 via a low-voltage wire 41n. The reactor 46 is provided between a midpoint 44 of the switching elements 42u and 42d and the positive terminal 22p of the external I/F 20. Each of the switching elements 42u and 42d is an insulated gate bipolar transistor (IGBT). In a modification, each of the switching elements 42u and 42d may be any other switching element such as a metal-oxide-semiconductor field effect transistor (MOSFET).

The main relay 45 and the smoothing capacitor 48 are connected between the battery 50 and the voltage converter 40. The smoothing capacitor 48 suppresses pulsation of a current flowing between the voltage converter 40 and the battery 50. The main relay 45 electrically conducts or interrupts the battery 50 and the voltage converter 40.

A fuse 54 is connected between the main relay 45 and the cathode 50p of the battery 50. A circuit including a bypass relay 58 and a resistor 56 is connected in parallel to the main relay 45 between the main relay 45 and the anode 50n of the battery 50. By turning OFF the main relay 45 and turning ON the bypass relay 58, electric power output from the battery 50 passes through the resistor 56. As a result, it is possible to prevent a current of the electric power passing through the power supply device 10 from excessively increasing momentarily.

The external relay 25 and the I/F connection circuit 30 are connected between the external I/F 20 and the voltage converter 40. The external relay 25 electrically conducts or interrupts an external device connected to the external I/F 20 and the power supply device 10. The I/F connection circuit 30 includes a positive line 30p, a negative line 30n, a main switching element 32, and filter capacitors 34 and 36. The I/F connection circuit 30 electrically connects the external I/F 20 and the voltage converter 40. The positive line 30p connects the positive terminal 22p of the external I/F 20 and the reactor 46. The negative line 30n connects the negative terminal 22n of the external I/F 20 and the anode 50n of the battery 50. The main switching element 32 is provided on the negative line 30n to serve as a switch that electrically interrupts the I/F connection circuit 30, and is an IGBT.

The low-voltage circuit 60 branches from the I/F connection circuit 30 and includes a low-voltage switching element 62 and a fuse 64. The low-voltage circuit 60 is connected to an air conditioner 70. The air conditioner 70 is a load having a rated voltage of 400 V, and conditions air in the cabin of the electrified vehicle 100. In a modification, an alternating-current (AC) inverter of the electrified vehicle 100 may be connected to the low-voltage circuit 60 instead of the air conditioner 70, or a heater for heating circulating water of the electrified vehicle 100 may be connected to the low-voltage circuit 60. In a further modification, another low-voltage load may be connected to the low-voltage circuit 60 in addition to the air conditioner 70. The low-voltage switching element 62 is an IGBT and is connected between the air conditioner 70 and the negative line 30n of the I/F connection circuit 30. That is, the low-voltage switching element 62 is provided on the low-voltage circuit 60. Although details will be described later, the low-voltage switching element 62 constitutes at least a part of an interrupt circuit that electrically interrupts the low-voltage circuit 60 and the I/F connection circuit 30. The switching elements 42u, 42d, 32, and 62 provided in the power supply device 10 have the same structure, and each include a current sensor (not shown), a temperature sensor (not shown), and the like.

The electronic control unit 80 is a computer including a central processing unit (CPU). For example, the external I/F 20 is electrically connected to the switching elements 42u and 42d of the voltage converter 40, the battery 50, the main switching element 32, the low-voltage switching element 62, and the air conditioner 70. For example, the electronic control unit 80 receives signals from the connected devices 20, 40, 50, 32, 62, and 70, and controls operations of the devices 25, 40, 45, 50, 32, 62, and 70.

Figure 2:
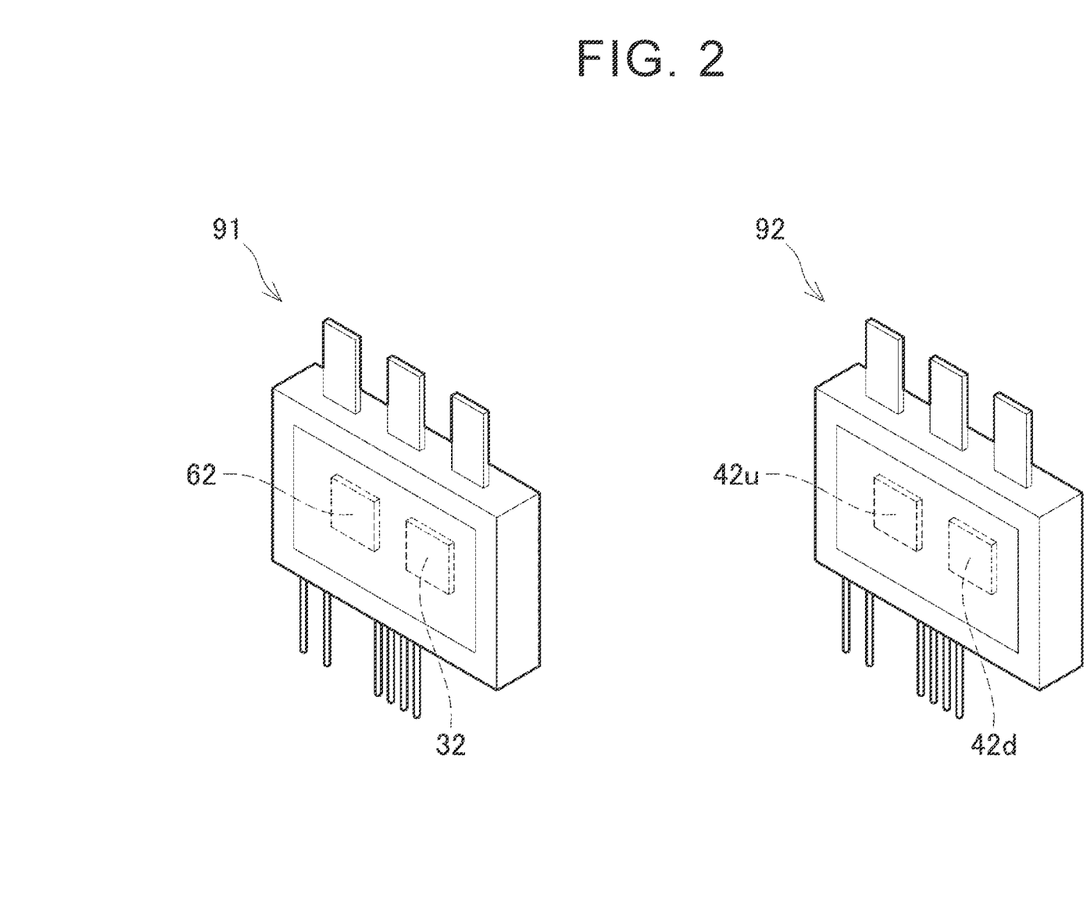
FIG. 2 is a perspective view of semiconductor packages in the power supply device of the first embodiment.

As shown in FIG. 1, both the switching elements 62 and 32 are connected to the anode 50n side of the battery 50. Therefore, as shown in FIG. 2, both the low-voltage switching element 62 of the low-voltage circuit 60 and the main switching element 32 of the I/F connection circuit 30 can be housed in a single first semiconductor package 91. In the semiconductor package 91, the switching elements 62 and 32 are sealed inside a resin package. By disposing the switching elements 62 and 32 in the single first semiconductor package 91 in this way, the switching elements 62 and 32 can be disposed with good spatial efficiency. Thus, the size of the power supply device 10 can be reduced. In a modification, both the switching elements 62 and 32 may be connected to the cathode 50p side of the battery 50.

In the semiconductor package 91, a positive terminal, a negative terminal, a midpoint terminal, a plurality of signal terminals, and the like extend outside the resin package. Each terminal extending outside the resin package is connected to the power supply device 10. Thus, the switching elements 62 and 32 in the resin package are electrically connected to the power supply device 10.

Similarly, both the upper switching element 42u and the lower switching element 42d of the voltage converter 40 are housed in a single second semiconductor package 92. In the semiconductor package 92, the switching elements 42u and 42d are sealed inside a resin package. The semiconductor packages 91 and 92 have the same structure. Each of the semiconductor packages 91 and 92 is a mass-producible module called "power card". In the power supply device 10 of the first embodiment, both the semiconductor package 91 that houses the switching elements 62 and 32 and the semiconductor package 92 that houses the switching elements 42u and 42d have the same structure. Therefore, the manufacturing efficiency of the power supply device 10 can be improved.

The electronic control unit 80 receives, from the external I/F 20, characteristics of an external device (hereinafter referred to as "target external device") connected to the external I/F 20. The characteristics include a type of the target external device (that is, a charging device or a PCS) and a rated voltage of the target external device (that is, 400 V or 800 V). The electronic control unit 80 controls the operations of the voltage converter 40 and the switching elements 32 and 62 based on the characteristics of the target external device that are received from the external I/F 20.

Referring to FIG. 1, description will be given of the control on the voltage converter 40 and the switching elements 32 and 62 to be executed by the electronic control unit 80 when the power supply device 10 is connected to the high-voltage charging device 4H. The electronic control unit 80 executes a first mode when a signal indicating that the high-voltage charging device 4H is connected to the external I/F 20 and a signal indicating that the rated voltage of the high-voltage charging device 4H is 800 V that agrees with the rated voltage of the battery 50 are received from the external I/F 20. In the first mode, the electronic control unit 80 keeps ON the upper switching element 42u of the voltage converter and keeps OFF the lower switching element 42d. Therefore, charging power of 800 V of the high-voltage charging device 4H is supplied to the battery 50 via the external I/F 20 and the voltage converter 40. As a result, the battery 50 is charged. That is, in the first mode, the voltage converter 40 does not transform the charging power from the high-voltage charging device 4H.

As described above, the air conditioner 70 has the rated voltage of 400 V. Therefore, when the power supply device 10 is connected to the high-voltage charging device 4H, the voltage of the I/F connection circuit 30 (that is, 800 V corresponding to the rated voltages of the high-voltage charging device 4H and the battery 50) is higher than the rated voltage of the air conditioner 70. Therefore, the electronic control unit 80 operates to keep ON the main switching element 32 in the first mode. The electronic control unit 80 operates to keep OFF the low-voltage switching element 62 in the first mode. Thus, the low-voltage circuit 60 is electrically interrupted by the low-voltage switching element 62. As a result, the electric power of 800 V that is higher than the rated voltage of 400 V of the air conditioner 70 is not applied to the air conditioner 70 via the low-voltage circuit 60. As a result, it is possible to prevent damage to the air conditioner 70. In this way, the low-voltage switching element 62 protects the air conditioner 70 from overvoltage. The electronic control unit 80 keeps OFF the low-voltage switching element 62 during the 800 V charging (that is, when the high-voltage charging device 4H is connected to the external I/F 20 and the voltage of the I/F connection circuit 30 exceeds 400 V), thereby preventing damage to the air conditioner 70.

Figure 3:
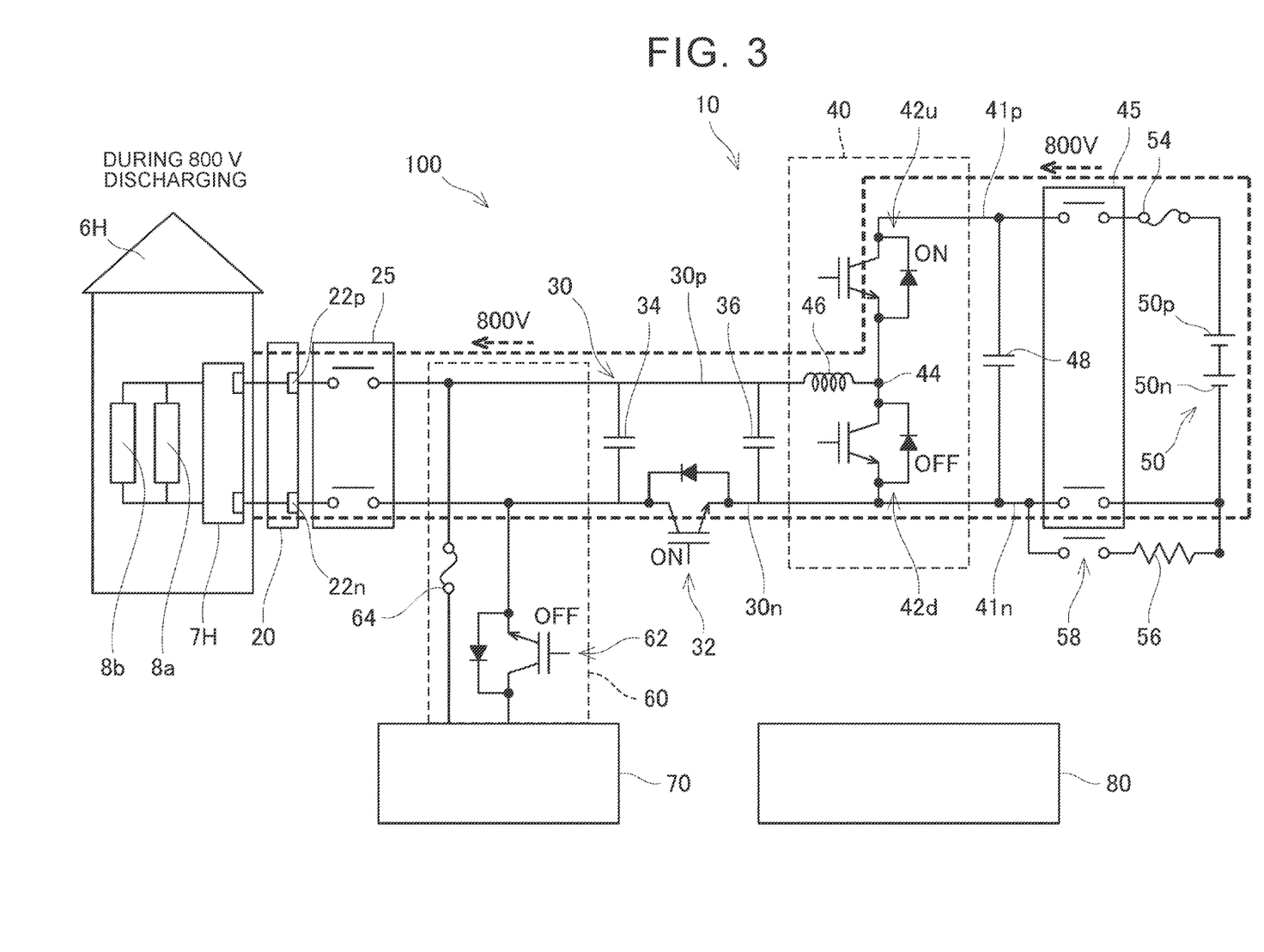
FIG. 3 is a circuit diagram of the power supply device of the first embodiment during 800 V discharging.

Referring to FIG. 3, description will be given of the control on the voltage converter 40 and the switching elements 32 and 62 to be executed by the electronic control unit 80 when the power supply device 10 is connected to the high-voltage PCS 7H. The high-voltage PCS 7H is installed in a house 6H. The high-voltage PCS 7H distributes electric power to a plurality of power supplies 8a and 8b in the house 6H. The electronic control unit 80 executes the first mode when a signal indicating that the high-voltage PCS 7H is connected to the external I/F 20 and a signal indicating that the rated voltage of the high-voltage PCS 7H is 800 V that agrees with the rated voltage of the battery 50 are received from the external I/F 20. As described above, in the first mode, the electronic control unit 80 keeps ON the upper switching element 42u of the voltage converter 40 and keeps OFF the lower switching element 42d. Therefore, discharged power of 800 V of the battery 50 is supplied to the external I/F 20 without being stepped down by the voltage converter 40. As a result, the discharged power of 800 V of the battery 50 is supplied to the high-voltage PCS 7H via the voltage converter 40 and the external I/F 20. Thus, the high-voltage PCS 7H can use the discharged power of the battery 50 in the house 6H. The electronic control unit 80 operates to keep OFF the low-voltage switching element 62. Therefore, the low-voltage circuit 60 is electrically interrupted by the low-voltage switching element 62. Therefore, the electric power of 800 V that is higher than the rated voltage of 400 V of the air conditioner is not applied to the air conditioner 70. As a result, damage to the air conditioner 70 is prevented during the 800 V discharging.

Figure 4:
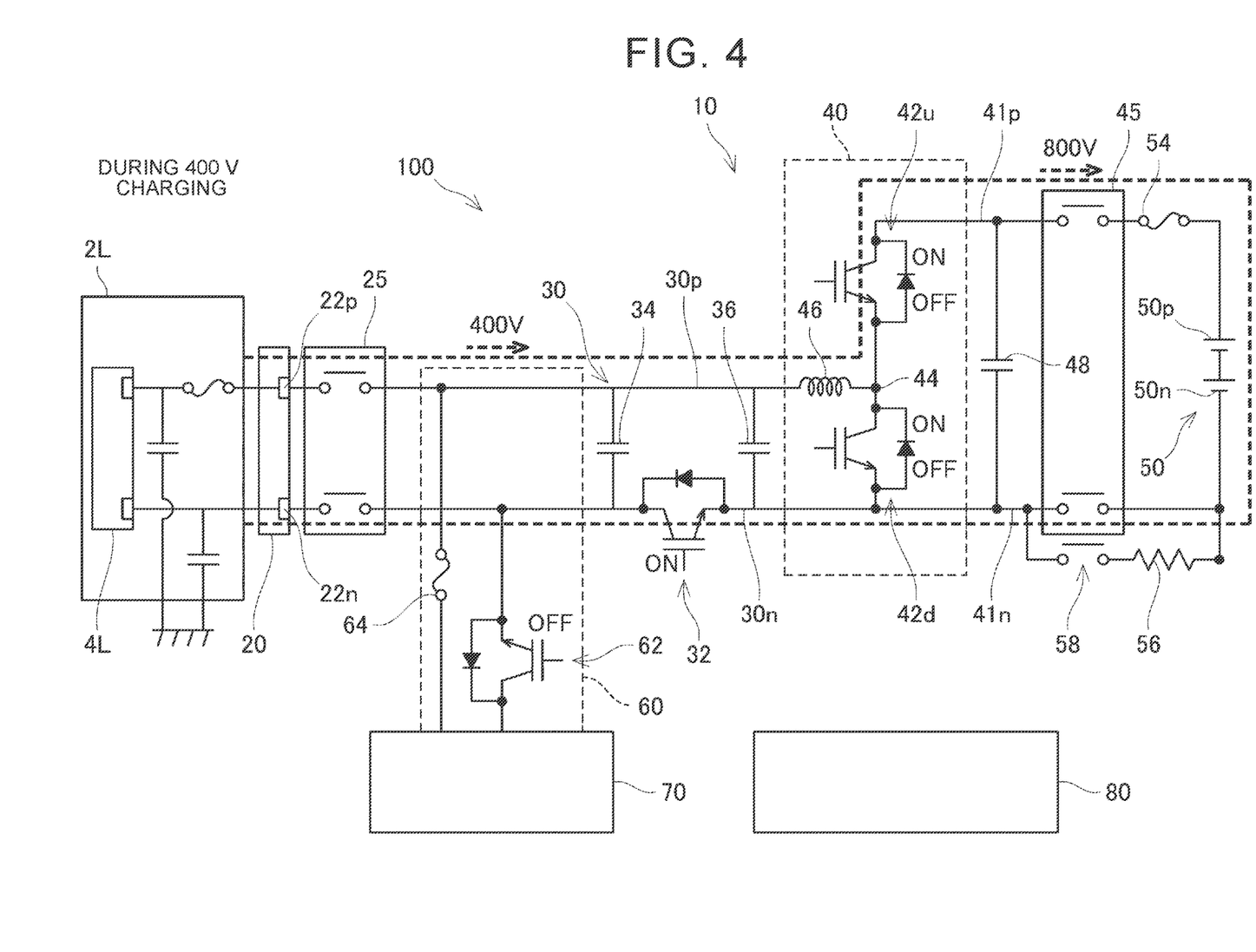
FIG. 4 is a circuit diagram of the power supply device of the first embodiment during 400 V charging.

Referring to FIG. 4, description will be given of the control on the voltage converter 40 and the switching elements 32 and 62 to be executed by the electronic control unit 80 when the power supply device 10 is connected to the low-voltage charging device 4L. The low-voltage charging device 4L is installed at a charging station 2L. The electronic control unit 80 executes a second mode when a signal indicating that the low-voltage charging device 4L is connected to the external I/F 20 and a signal indicating that the rated voltage of the low-voltage charging device 4L is 400 V lower than the rated voltage of the battery 50 are received from the external I/F 20. In the second mode, the electronic control unit 80 intermittently turns ON and OFF the upper switching element 42u and the lower switching element 42d of the voltage converter 40. The electronic control unit 80 keeps ON the main switching element 32 and keeps OFF the low-voltage switching element 62.

In the second mode during the charging of the battery 50, when the lower switching element 42d is turned ON, a current flows from the positive line 30p of the I/F connection circuit 30 to the low-voltage wire 41n via the reactor 46 and the lower switching element 42d. Then, the lower switching element 42d is turned OFF and the upper switching element 42u is turned ON. As a result, the voltage at the midpoint 44 increases by an induced electromotive force of the reactor 46 that is generated in a direction from the I/F connection circuit 30 to the midpoint. Therefore, a current flows from the positive line 30p of the I/F connection circuit 30 to the high-voltage wire 41p via the reactor 46, the upper switching element 42u, and a diode connected in parallel to the upper switching element 42u. The smoothing capacitor 48 is charged by the flowing current, and the voltage of the high-voltage wire 41p increases. Thus, the voltage of the electric power supplied to the battery 50 increases. Accordingly, in the second mode during the 400 V charging, the electronic control unit 80 intermittently turns ON and OFF the switching elements 42u and 42d of the voltage converter 40. Therefore, the charging power of 400 V lower than the rated voltage of 800 V of the battery 50 is increased to 800 V and supplied to the battery 50.

Figure 5:
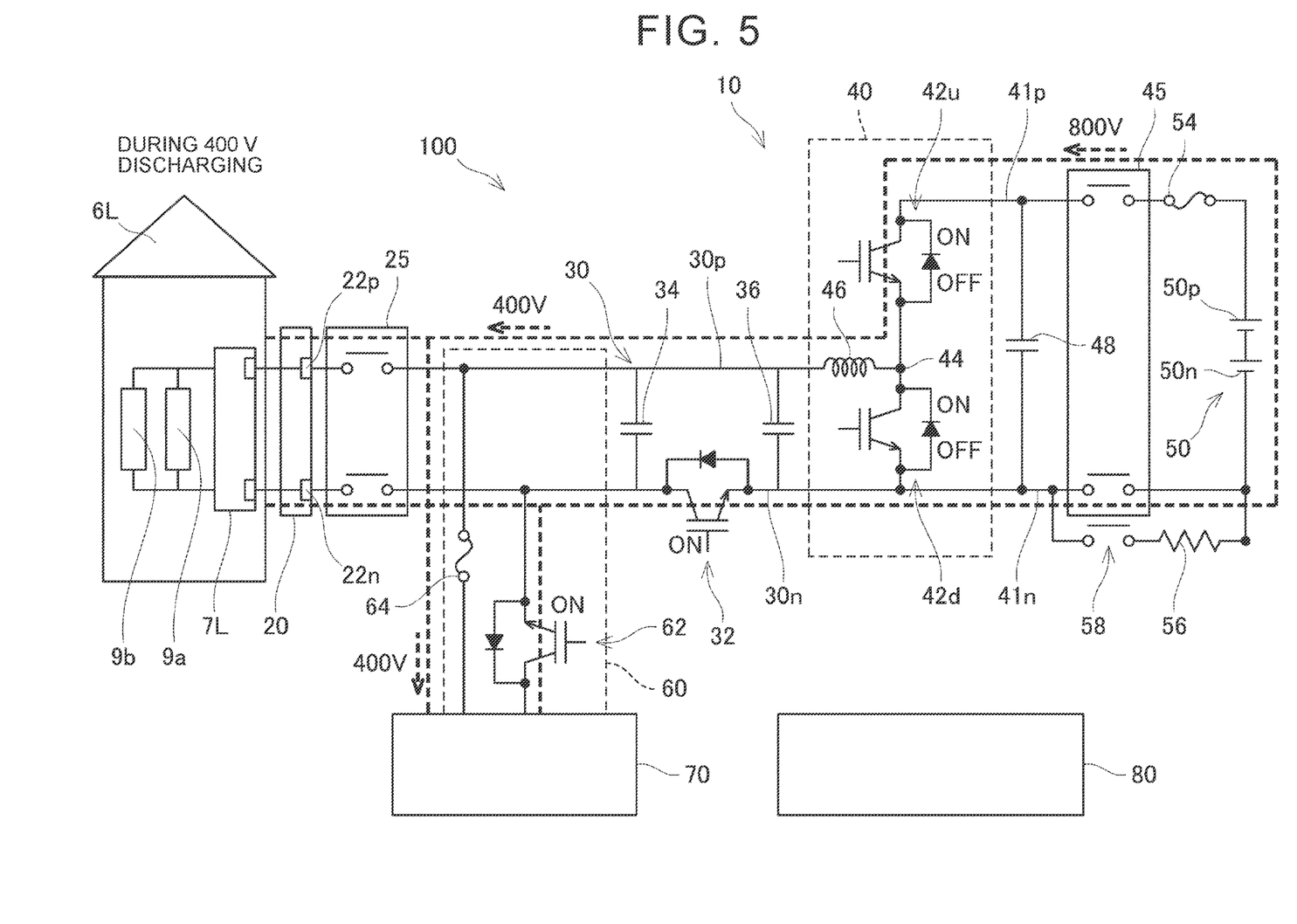
FIG. 5 is a circuit diagram of the power supply device of the first embodiment during 400 V discharging.

Referring to FIG. 5, description will be given of the control on the voltage converter 40 and the switching elements 32 and 62 to be executed by the electronic control unit 80 when the power supply device 10 is connected to the low-voltage PCS 7L. The low-voltage PCS 7L is installed in a house 6L. The low-voltage PCS 7L distributes electric power to a plurality of power supplies 9a and 9b in the house 6L. The electronic control unit 80 executes the second mode when a signal indicating that the low-voltage PCS 7L is connected to the external I/F 20 and a signal indicating that the rated voltage of the low-voltage PCS 7L is 400 V lower than the rated voltage of the battery 50 are received from the external I/F 20. In the second mode, the electronic control unit 80 intermittently turns ON and OFF the upper switching element 42u and the lower switching element 42d of the voltage converter 40.

In the second mode during 400 V discharging of the battery 50, when the upper switching element 42u is turned ON, a current flows from the high-voltage wire 41p to the reactor 46 via the upper switching element 42u and the midpoint 44. Then, the upper switching element 42u is turned OFF and the lower switching element 42d is turned ON. As a result, the potential of the midpoint 44 decreases by the induced electromotive force of the reactor 46 described above. As a result, a current flows from the low-voltage wire 41n to the positive line 30p via the lower switching element 42d, a diode connected in parallel to the lower switching element 42d, and the reactor 46.

Accordingly, in the second mode during the 400 V discharging, the electronic control unit 80 intermittently turns ON and OFF the switching elements 42u and 42d of the voltage converter 40. Therefore, the discharged power of the battery 50 is stepped down to 400 V from the rated voltage of 800 V of the battery 50 and supplied to the low-voltage PCS 7L. In the second mode during the discharging, the electronic control unit 80 keeps ON the main switching element 32 and keeps ON the low-voltage switching element 62. That is, when a signal indicating that the rated voltage of the low-voltage PCS 7L is 400 V equal to or lower than the rated voltage of the air conditioner 70 is received from the external I/F 20, the electronic control unit 80 causes the low-voltage switching element 62 to electrically conduct the low-voltage circuit 60. As a result, the discharged power of the battery 50 that has been stepped down to 400 V by the voltage converter 40 can be supplied to the air conditioner 70 via the low-voltage circuit 60. The power supply device 10 can operate the air conditioner 70 by using the discharged power of the battery 50. In this way, the electronic control unit 80 can supply the stepped-down discharge voltage of the battery 50 to the air conditioner 70 by keeping ON the low-voltage switching element 62 during the 400 V discharging (that is, when the low-voltage PCS 7L is connected to the external I/F 20 and the voltage of the I/F connection circuit 30 agrees with 400 V).

Figure 6:
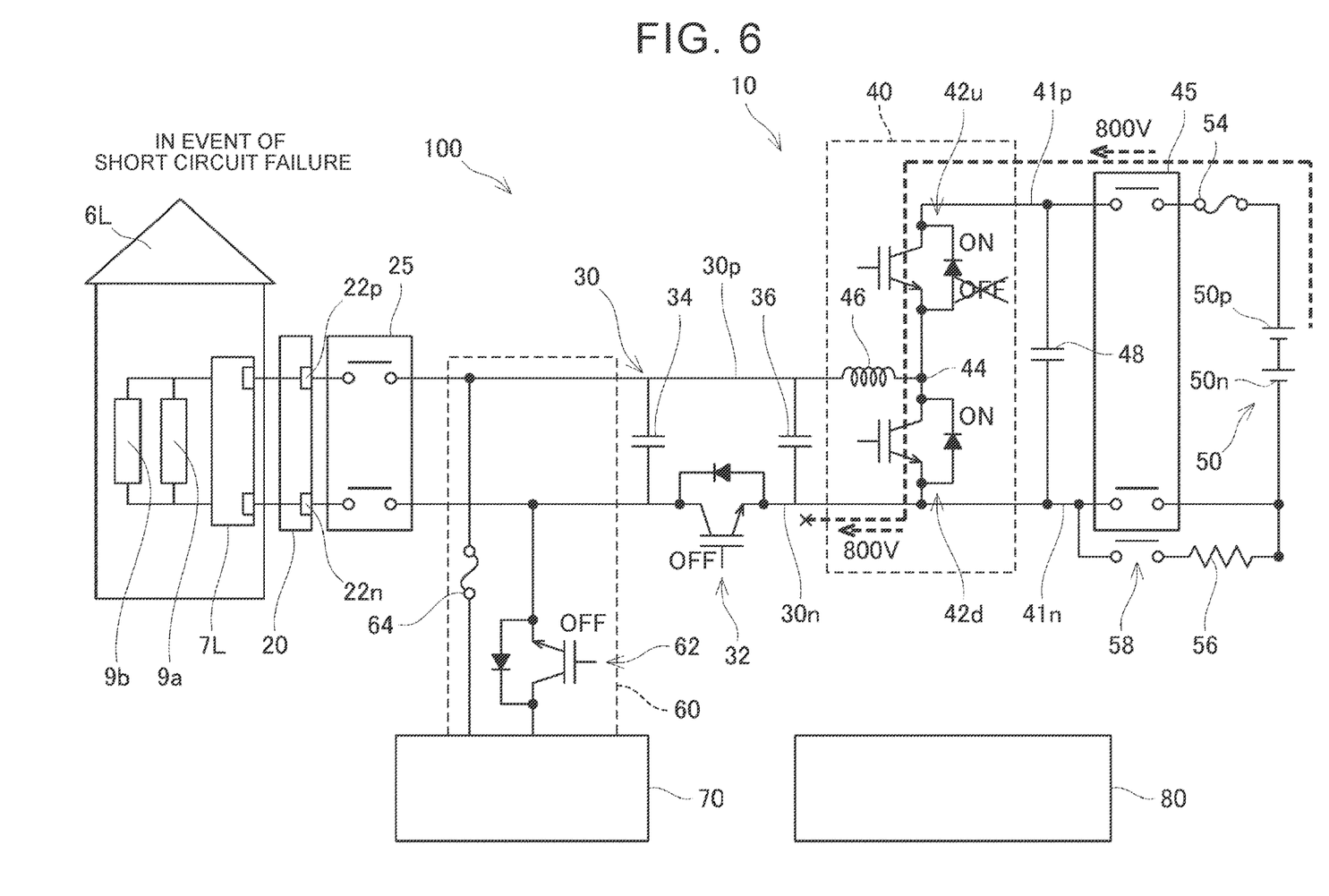
FIG. 6 is a circuit diagram when a short circuit failure occurs in an upper switching element shown in FIG. 1 during the 400 V discharging.

Referring to FIG. 6, description will be given of the control on the voltage converter 40 and the switching elements 32 and 62 to be executed by the electronic control unit 80 when a short circuit failure occurs in the upper switching element 42u of the voltage converter 40 while the power supply device 10 is connected to the low-voltage PCS 7L. When the short circuit failure occurs in the upper switching element 42u, the upper switching element 42u is energized. As a result, the discharged power of 800 V of the battery 50 is applied to the lower switching element 42d from the high-voltage wire 41p without being stepped down. Therefore, the current sensor (not shown) of the lower switching element 42d detects that a current exceeding a threshold has flowed through the lower switching element 42d. In this case, the lower switching element 42d transmits, to the electronic control unit 80, a signal indicating that the upper switching element 42u is short-circuited.

The electronic control unit 80 turns OFF the main switching element 32 when the signal indicating that the upper switching element 42u is short-circuited is received from the lower switching element 42d. As a result, the I/F connection circuit 30 is electrically interrupted by the main switching element 32. Thus, it is possible to prevent the discharged power of 800 V of the battery 50 from being supplied to the low-voltage PCS 7L via the external I/F 20. Since the discharged power of the battery 50 that exceeds the rated voltage of 400 V of the low-voltage PCS 7L is not supplied to the low-voltage PCS 7L, it is possible to prevent damage to the low-voltage PCS 7L. The electronic control unit 80 operates to keep OFF the low-voltage switching element 62. Thus, it is possible to prevent the discharged power of 800 V of the battery 50 from being supplied to the air conditioner 70 via the low-voltage circuit 60. As a result, it is possible to prevent damage to the air conditioner 70.

Figure 7:
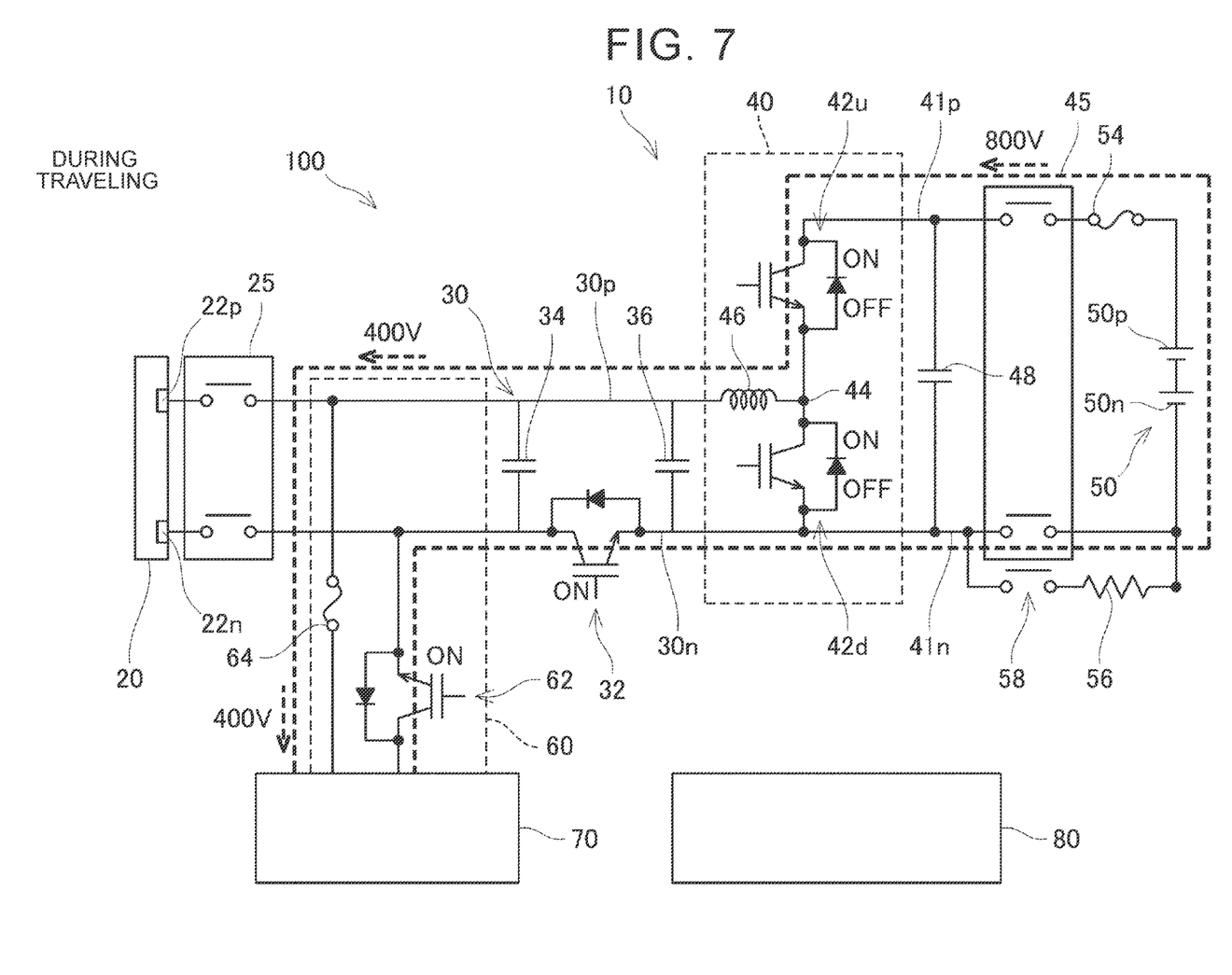
FIG. 7 is a circuit diagram of the power supply device of the first embodiment during traveling of an electrified vehicle.
Figure 8:
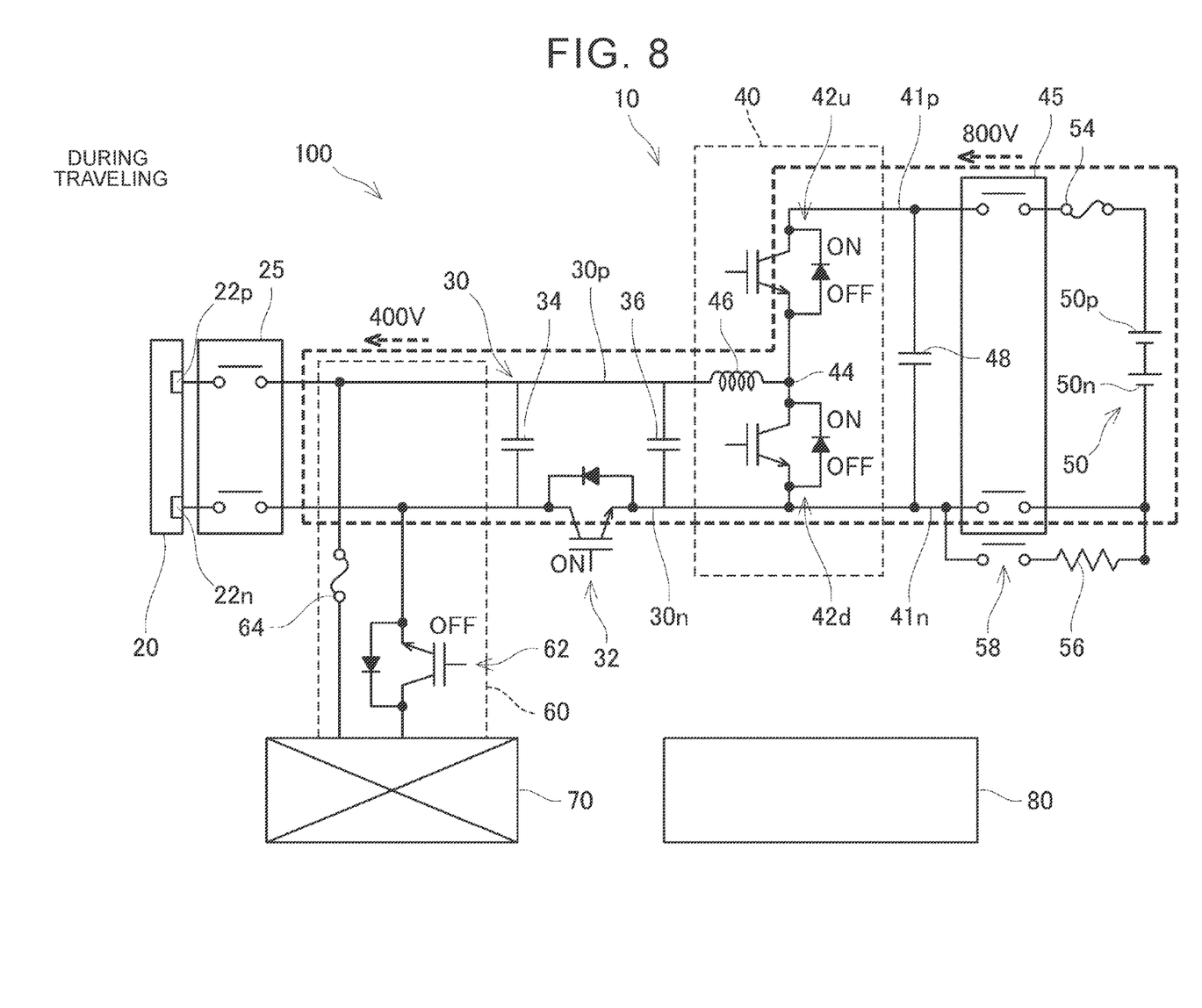
FIG. 8 is a circuit diagram when an abnormality occurs in an air conditioner during the traveling of the electrified vehicle.

Referring to FIGS. 7 and 8, description will be given of the control on the voltage converter 40 and the switching elements 32 and 62 to be executed by the electronic control unit 80 during traveling of the electrified vehicle 100. When the electrified vehicle 100 is traveling, the discharged power of 800 V of the battery 50 is supplied to the traveling motor (not shown) of the electrified vehicle 100. Therefore, the traveling motor is driven. While the electrified vehicle 100 is traveling, the electronic control unit 80 keeps ON the main switching element 32 and the low-voltage switching element 62 while executing the second mode during the 400 V discharging described with reference to FIG. 5. That is, the electronic control unit 80 causes the low-voltage switching element 62 to electrically conduct the low-voltage circuit when the voltage converter 40 steps down the output of the battery 50 and the voltage of the I/F connection circuit 30 is lower than the rated voltage of the air conditioner 70. Therefore, the discharged power of 800 V of the battery 50 is stepped down to the rated voltage of 400 V of the air conditioner 70 and supplied to the air conditioner 70. As a result, the air conditioner 70 can be operated by using the discharged power of the battery 50 while the electrified vehicle 100 is traveling.

Referring to FIG. 8, description will be given of the control on the voltage converter 40 and the switching elements 32 and 62 to be executed by the electronic control unit 80 when an abnormality occurs in the air conditioner 70 during the traveling of the electrified vehicle 100. When a signal indicating that an abnormality occurs in the air conditioner 70 is received from the air conditioner 70, the electronic control unit 80 operates to keep ON the main switching element 32 and keep OFF the low-voltage switching element 62 while maintaining the second mode. As a result, the low-voltage circuit 60 is electrically interrupted by the low-voltage switching element 62. Therefore, even if the abnormality occurs in the air conditioner 70, it is possible to prevent the abnormality from affecting the voltage converter 40, the battery 50, or the like. As a result, the electrified vehicle 100 can continue to travel even if the abnormality occurs in the air conditioner 70. In a modification, when a signal indicating that an abnormality occurs in the air conditioner 70 is received, the electronic control unit 80 may operate to keep ON the main switching element 32 and keep OFF the low-voltage switching element 62 after transition is made to the first mode.

Although illustration is omitted, when an abnormality occurs in the air conditioner 70 while the power supply device 10 is connected to the low-voltage PCS 7L as described in FIG. 5, the electronic control unit 80 operates to keep ON the main switching element 32 and keep OFF the low-voltage switching element 62 while executing the second mode. Therefore, even if the abnormality occurs in the air conditioner 70, it is possible to prevent the abnormality from affecting the low-voltage PCS 7L. As a result, the power supply device 10 can continue to supply electric power to the low-voltage PCS 7L even if the abnormality occurs in the air conditioner 70.

Correspondences of the low-voltage switching element 62 and the main switching element 32 in the present disclosure will be described below. The low-voltage switching element 62 is an example of a "first switching element" of the present disclosure. The main switching element 32 is an example of a "second switching element" of the present disclosure. The voltage of 400 V is an example of a "rated voltage of low-voltage load" of the present disclosure.

Next, a power supply device 10a according to a second embodiment of the present disclosure will be described with reference to FIGS. 9 and 10. Comparing the power supply device 10 of the first embodiment and the power supply device 10a of the second embodiment, the power supply device 10a of the second embodiment includes a low-voltage circuit 60a instead of the low-voltage circuit 60 of the first embodiment. Except for this point, the power supply device 10 of the first embodiment and the power supply device 10a of the second embodiment have the same configuration.

Comparing the low-voltage circuit 60 of the first embodiment and the low-voltage circuit 60a of the second embodiment, the low-voltage circuit 60a of the second embodiment includes a step-down converter 66 instead of the low-voltage switching element 62 of the first embodiment. Except for this point, the low-voltage circuit 60 of the first embodiment and the low-voltage circuit 60a of the second embodiment have the same configuration.

Figure 9:
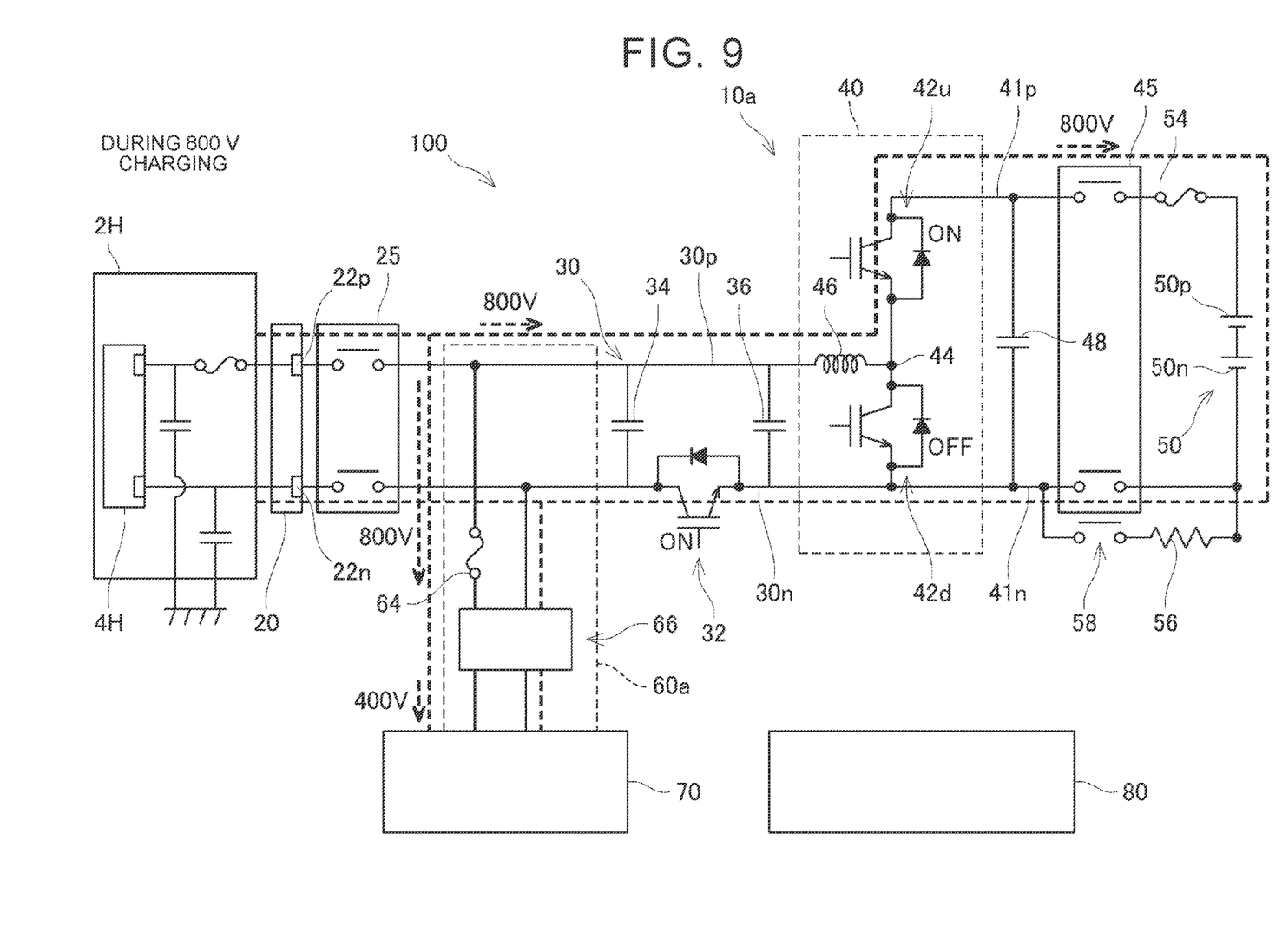
FIG. 9 is a circuit diagram of a power supply device of a second embodiment of the present disclosure during 800 V charging.

Referring to FIG. 9, description will be given of control on the step-down converter 66 to be executed by the electronic control unit 80 of the second embodiment when the power supply device 10a of the second embodiment is connected to the high-voltage charging device 4H. Similarly to the first embodiment, the electronic control unit 80 of the second embodiment executes the first mode when a signal indicating that the high-voltage charging device 4H is connected to the external I/F 20 and a signal indicating that the rated voltage of the high-voltage charging device 4H is 800 V that agrees with the rated voltage of the battery 50 are received from the external I/F 20. Therefore, the charging power of 800 V of the high-voltage charging device 4H is supplied to the battery 50 via the external I/F 20, the I/F connection circuit 30, and the voltage converter 40.

The electronic control unit 80 of the second embodiment executes the first mode and operates the step-down converter 66 when the voltage of the I/F connection circuit 30 is 800 V higher than the rated voltage of 400 V of the air conditioner 70. As a result, the voltage of the I/F connection circuit 30 is stepped down to 400 V by the step-down converter 66 and supplied to the low-voltage circuit 60a.

Figure 10:
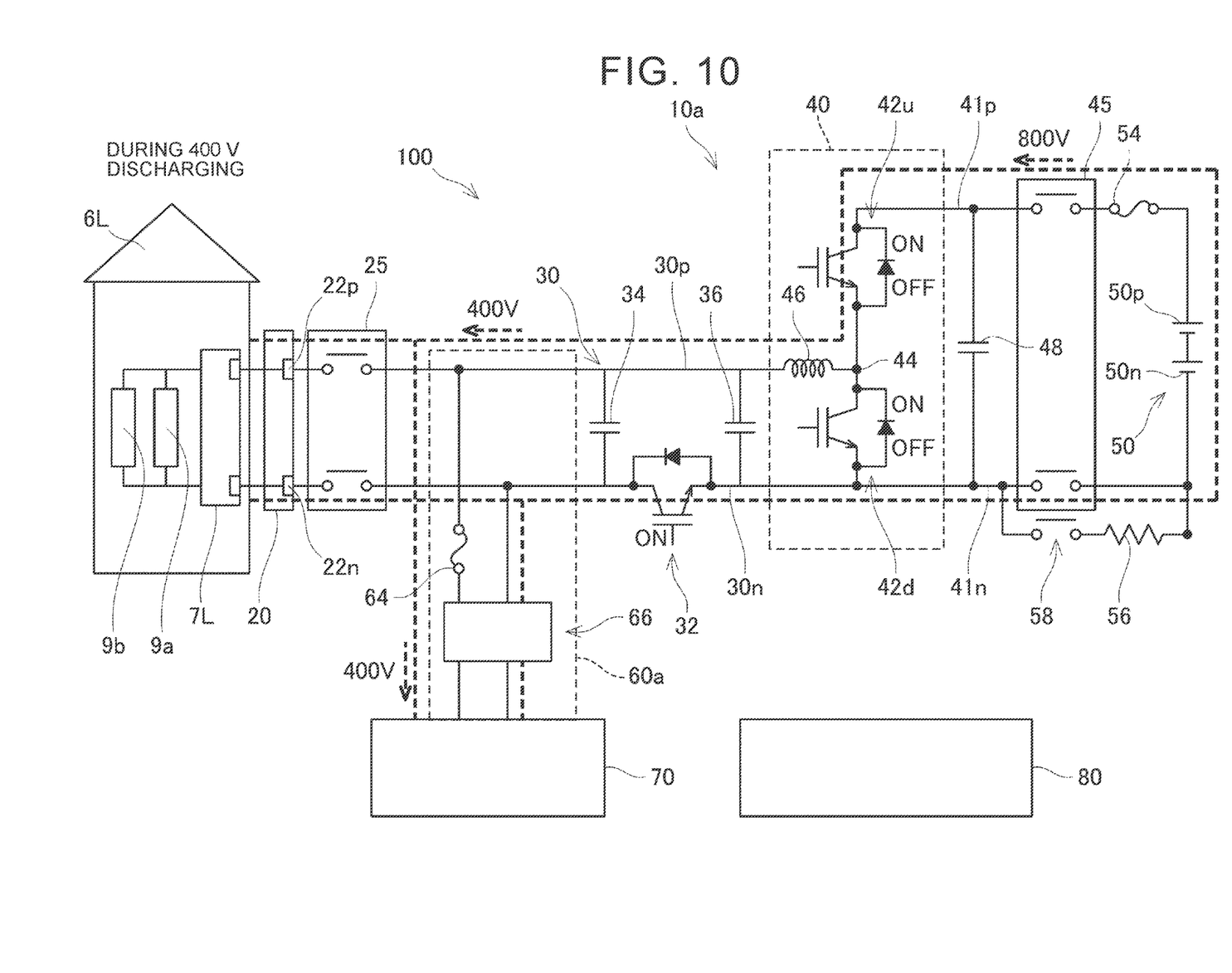
FIG. 10 is a circuit diagram of the power supply device of the second embodiment during 400 V discharging.

Referring to FIG. 10, description will be given of the control on the step-down converter 66 to be executed by the electronic control unit 80 of the second embodiment when the power supply device 10a of the second embodiment is connected to the low-voltage PCS 7L. The electronic control unit 80 of the second embodiment executes the second mode when a signal indicating that the low-voltage PCS 7L is connected to the external I/F 20 and a signal indicating that the rated voltage of the low-voltage PCS 7L is 400 V lower than the rated voltage of the battery 50 are received from the external I/F 20. As a result, the discharged power of the battery 50 is stepped down from the rated voltage of 800 V of the battery 50 to 400 V and supplied to the low-voltage PCS 7L.

The electronic control unit 80 of the second embodiment executes the second mode and does not operate the step-down converter 66 when the voltage of the I/F connection circuit 30 is 400 V equal to the rated voltage of 400 V of the air conditioner 70. As a result, the voltage of the I/F connection circuit 30 is supplied to the low-voltage circuit 60a without being stepped down by the step-down converter 66.

Thus, according to the power supply device 10a of the second embodiment, even when the power supply device 10a is connected to the high-voltage charging device 4H and the voltage of the I/F connection circuit 30 is 800 V, the voltage can be stepped down to 400 V by the step-down converter 66 provided in the low-voltage circuit 60a. Therefore, in the power supply device 10a of the second embodiment, even if the voltage of the I/F connection circuit 30 is 800 V, electric power of 400 V can appropriately be supplied to the air conditioner 70 without electrically interrupting the low-voltage circuit 60a.

Although the specific examples of the technology disclosed herein have been described in detail above, these are merely examples and do not limit the scope of claims. The technology described in the claims includes various modifications and alterations of the specific examples illustrated above. Modifications of the above embodiments will be described below.

A first modification will be described. In the above embodiments, the external I/F 20 is connected to the DC external device (for example, the high-voltage charging device 4H). In the first modification, the external I/F 20 may be connected to an AC external device. In that case, the power supply device 10 may include an AC-DC converter provided, for example, between the external relay 25 and the I/F connection circuit 30.

Next, a second modification will be described. In the first embodiment described above, the electronic control unit 80 controls the voltage converter 40 and the switching elements 32 and 62 based on the signals received from the external I/F 20. In the second modification, the electronic control unit 80 may receive, from the external I/F 20, a signal indicating a direction of a current and a voltage value of the connected external device instead. In that case, the electronic control unit 80 may control the voltage converter 40 and the switching elements 32 and 62 based on the received signal and voltage value.

Next, a third modification will be described. The voltage converter 40 need not include, for example, the upper switching element 42u. In that case, the power supply device 10 may include, for example, a bypass circuit that bypasses the voltage converter 40 when the low-voltage PCS 7L is connected to the external I/F 20.

Next, a fourth modification will be described. The power supply device 10 need not include the main switching element 32.

Next, a fifth modification will be described. The low-voltage switching element 62 and the main switching element 32 need not be sealed in the single first semiconductor package 91.

Next, a sixth modification will be described. The upper switching element 42u and the lower switching element 42d need not be sealed in the single second semiconductor package 92. The semiconductor packages 91 and 92 may have different structures.

Next, a seventh modification will be described. The external I/F 20 need not be configured such that the PCS is attachable or detachable. In that case, both the high-voltage charging device 4H and the low-voltage charging device 4L may be attachable to or detachable from the external I/F 20.

Next, an eighth modification will be described. The external I/F 20 need not be configured such that the charging device is attachable or detachable. In that case, both the high-voltage PCS 7H and the low-voltage PCS 7L may be attachable to or detachable from the external I/F 20.

Next, a ninth modification will be described. The rated voltage of the battery 50 is not limited to 800 V, and may be higher or lower than 800 V. The rated voltage of the battery 50 may be, for example, 400 V. Similarly, the rated voltage of the air conditioner 70 may be higher or lower than 400 V. The rated voltage of the air conditioner 70 may be, for example, 12 V. In a further modification, instead of the rated voltage of the battery 50, a measured actual voltage value may be compared with the rated voltage of each external device (that is, the high-voltage charging device 4H, the low-voltage charging device 4L, the high-voltage PCS 7H, or the low-voltage PCS 7L).

Next, a tenth modification will be described. The rated voltages of the high-voltage charging device 4H and the high-voltage PCS 7H may be higher or lower than 800 V. For example, the rated voltage of the high-voltage charging device 4H may be 1000 V significantly higher than the rated voltage of 800 V of the battery 50. The high-voltage charging device 4H having such a rated voltage of 1000 V can also supply electric power of 800 V suitable for charging of the battery 50 to the power supply device 10. Therefore, in the present modification, the electronic control unit 80 may execute the first mode when a signal indicating that the rated voltage of the high-voltage charging device 4H is equal to or higher than the rated voltage of the battery 50 is received.

The technical elements illustrated in the present specification or the drawings exhibit technical utility alone or in various combinations, and are not limited to the combinations set forth in the claims as originally filed. The technology illustrated in the present specification or the drawings may achieve a plurality of objects at the same time, and has technical utility by achieving one of the objects.

What is claimed is:

1. A power supply device comprising:
    a battery;
    an external interface electrically connected to the battery and electrically attachable to or detachable from an external device;
    a voltage converter provided between the battery and the external interface;
    a low-voltage circuit that branches from an interface connection circuit connecting the external interface and the voltage converter and is connected to a low-voltage load having a rated voltage lower than a voltage of the battery;
    an interrupt circuit provided in the low-voltage circuit and configured to electrically interrupt the low-voltage circuit and the interface connection circuit; and
    an electronic control unit configured to control operations of the voltage converter and the interrupt circuit,
    wherein the electronic control unit is configured to operate the interrupt circuit when a voltage of the interface connection circuit exceeds the rated voltage of the low-voltage load.

2. The power supply device according to claim 1, wherein:
    the interrupt circuit includes a first switching element; and
    the electronic control unit is configured to cause the first switching element to electrically interrupt the low-voltage circuit when the voltage of the interface connection circuit exceeds the rated voltage of the low-voltage load.

3. The power supply device according to claim 2, wherein:

the electronic control unit is configured to cause the voltage converter to step down the voltage output from the battery to the interface connection circuit; and the electronic control unit is configured to cause the first switching element to electrically conduct the low-voltage circuit when the voltage of the interface connection circuit is lower than the rated voltage of the low-voltage load.

4. The power supply device according to claim 2, wherein the electronic control unit is configured to cause the first switching element to electrically conduct the low-voltage circuit when a rated voltage of the external device is equal to or lower than the rated voltage of the low-voltage load.

5. The power supply device according to claim 2, wherein:

the voltage converter includes:

an upper switching element connected to a cathode of the battery;

a lower switching element connected in series to the upper switching element and connected to an anode of the battery and a negative terminal of the external interface; and a reactor provided between a midpoint of the upper switching element and the lower switching element and a positive terminal of the external interface; and the electronic control unit is configured to execute, a first mode in which the upper switching element of the voltage converter is kept ON when a rated voltage of the external device is equal to or higher than the voltage of the battery, and a second mode in which the upper switching element and the lower switching element of the voltage converter are intermittently turned ON and OFF when the voltage of the interface connection circuit is lower than the voltage of the battery.

6. The power supply device according to claim 5, further comprising a second switching element provided in the interface connection circuit and configured to electrically conduct or interrupt the interface connection circuit, wherein the electronic control unit is configured to cause the second switching element to electrically interrupt the interface connection circuit when a short circuit failure occurs in the upper switching element of the voltage converter.

7. The power supply device according to claim 6, wherein both the first switching element and the second switching element are provided in a single first semiconductor package.

8. The power supply device according to claim 7, wherein:

both the upper switching element and the lower switching element are provided in a single second semiconductor package; and the first semiconductor package and the second semiconductor package have the same structure.

9. The power supply device according to claim 2, wherein the electronic control unit is configured to cause the first switching element to electrically interrupt the low-voltage circuit when an abnormality occurs in the low-voltage load connected to the low-voltage circuit regardless of the voltage of the interface connection circuit.

10. The power supply device according to claim 1, wherein the voltage of the battery is a rated voltage of the battery.

11. The power supply device according to claim 1, wherein the external interface is configured such that a charging device configured to supply charging power for the battery to the external interface is electrically attachable or detachable as the external device.

12. The power supply device according to claim 1, wherein the external interface is configured such that an external load configured to receive discharged power of the battery from the external interface is electrically attachable or detachable as the external device.

13. A control method for a power supply device, the power supply device including a battery, an external interface electrically connected to the battery and electrically attachable to or detachable from an external device, a voltage converter provided between the battery and the external interface, a low-voltage circuit that branches from an interface connection circuit connecting the external interface and the voltage converter and is connected to a low-voltage load having a rated voltage lower than a voltage of the battery, and an interrupt circuit provided in the low-voltage circuit and configured to electrically interrupt the low-voltage circuit and the interface connection circuit, the control method comprising:

controlling operations of the voltage converter and the interrupt circuit; and operating the interrupt circuit when a voltage of the interface connection circuit exceeds the rated voltage of the low-voltage load.

14. A power supply device comprising:

a battery;

an external interface electrically connected to the battery and electrically attachable to or detachable from an external device;

a voltage converter provided between the battery and the external interface;

a low-voltage circuit that branches from an interface connection circuit connecting the external interface and the voltage converter and is connected to a low-voltage load having a rated voltage lower than a voltage of the battery;

a step-down converter provided in the low-voltage circuit and configured to step down a supply voltage from the interface connection circuit to the low-voltage circuit; and an electronic control unit configured to control operations of the voltage converter and the step-down converter, wherein the electronic control unit is configured to operate the step-down converter when a voltage of the interface connection circuit exceeds the rated voltage of the low-voltage load.

* * * * *